United States Patent [19]
Yamashiro

[11] Patent Number: 5,864,694
[45] Date of Patent: Jan. 26, 1999

[54] EMULATION SYSTEM

[75] Inventor: Kiyomi Yamashiro, Kanagawa, Japan

[73] Assignee: NEC Corporation, Tokyo, Japan

[21] Appl. No.: 774,207

[22] Filed: Dec. 27, 1996

[30]     Foreign Application Priority Data

Dec. 27, 1995   [JP]   Japan .................................. 7-341521

[51] Int. Cl.[6] .................................................. G06F 9/455
[52] U.S. Cl. ......................... 395/500; 395/828; 395/882; 395/884; 395/800.43
[58] Field of Search ............................. 364/578; 395/500, 395/800.43, 828, 834, 821, 884, 882

[56]           References Cited

U.S. PATENT DOCUMENTS

| 5,329,471 | 7/1994 | Swoboda et al. ...................... 364/578 |
| 5,426,769 | 6/1995 | Pawloski ................................ 395/500 |
| 5,546,566 | 8/1996 | Katsuta .................................. 395/500 |

FOREIGN PATENT DOCUMENTS

| 9 633 529 A1 | 1/1995 | European Pat. Off. ......... G06F 11/00 |
| 2 696 561 | 10/1992 | France ............................. G06F 9/455 |
| 01272893 | 7/1991 | Japan .............................. G06F 15/78 |

*Primary Examiner*—Kevin J. Teska
*Assistant Examiner*—Thuan Do
*Attorney, Agent, or Firm*—Scully, Scott, Murphy & Presser

[57]           ABSTRACT

In an emulation system including first and second peripheral emulators, the second peripheral emulator having a conventional peripheral circuit and an additional peripheral circuit is additionally provided with an input/output switching circuit for switching over the input/output signal between the additional peripheral circuit and a peripheral circuit of the first peripheral emulator. Thus, it is possible to select, as the signal to be supplied to the additional peripheral circuit, either the signal supplied through an external terminal from the first peripheral emulator or the signal outputted from the conventional peripheral circuit, and simultaneously, it is also possible to selectively supply the signal outputted from the additional peripheral circuit, either to the first peripheral emulator through the external terminal, or to the conventional peripheral circuit. Thus, it is possible to access the additional peripheral circuit as the additional function of the peripheral circuit internally provided in the first peripheral emulator. Therefore, a product having an additional function added to the conventional peripheral circuit, can be emulated without changing the interrupt priority order or level.

1 Claim, 5 Drawing Sheets

EMULATION SYSTEM

BACKGROUND OF THE INVENTION

1. Field of the invention

The present invention relates to an emulation system, and more specifically to an emulation system used for debugging a software stored in a single-chip microcomputer and the like.

2. Description of related art

Recently, a wide variety of application instruments incorporating a single-chip microcomputer therein have been reduced into practice. With this tendency, a wide variety of single-chip microcomputers to be incorporated into the application instruments have been developed and manufactured on a mass production basis. In this connection, it is a general practice that, prior to development of a single-chip microcomputer, an emulation system is developed for the purpose of verifying an operation of a software used in the single-chip microcomputer to be developed and an operation of the application instrument.

In a single-chip microcomputer to be incorporated into an application instrument, it is an ordinary practice to develop a product which has a central processing unit (CPU) in common to other ones and a peripheral device different from other ones. Accordingly, in order to emulate a target product, an emulation system is constituted of a CPU emulator for carrying out emulation of the common CPU, and a peripheral emulator for carrying out emulation of the peripheral device. Therefore, for each different application instrument, the emulation is carried out by changing only the peripheral emulator. Thus, a single-chip microcomputer which can be used for a wide variety of application instruments, can be emulated.

However, for a wide variety of application instruments, it is not so effective to develop one peripheral emulator for each one product. Therefore, one approach has been often used to provide an emulation circuit internally in a single-chip microcomputer to be incorporated in the application instruments, and to control it by a signal supplied from an external, so as to cause it to function as a peripheral emulator. In this case, ten and a few external terminals are required to transfer interface signals between the CPU emulator and the peripheral emulator, and therefore, it actually becomes impossible to conduct the emulation operation while using these external terminals as an input/output port.

In order to overcome this problem, it has been proposed to use a plurality of peripheral emulators in combination so that, a function which cannot be emulated because of mutual transfer of interface signals, is compensated for by another peripheral emulator. This example is shown by Japanese Patent Application Laid-open Publication No. JP-A-02-130640.

In addition, for a product having a function added to a conventional peripheral circuit, it becomes in some cases that a first peripheral emulator provided for an existing peripheral circuit cannot emulate a peripheral circuit having an additional function. In the case of emulating the peripheral circuit having the additional function, by means of a second peripheral emulator separately added, it is in some cases an indispensable condition that an interrupt control function must be emulated by a single peripheral emulator, dependently upon the nature of the interrupt function. Therefore, if an interrupt request is generated in the inside of the second peripheral emulator which does not execute the emulation of the interrupt control function, the emulation is executed by supplying an interrupt request signal through an external terminal to the first peripheral emulator which executes the emulation of the interrupt control function. This example is shown by Japanese Patent Application Laid-open Publication No. JP-A-05-334460.

In this proposal, however, in the case of emulating the peripheral circuit having the additional function by the second peripheral emulator, since the interrupt request signal generated in the second peripheral emulator is supplied through the external terminal to the first peripheral emulator, a priority order and a vector code for the interrupt request signal in question have been previously determined as a matter of course. As a result, the priority order and the vector code for the interrupt request signal generated in the second peripheral emulator are different in an interrupt request processing timing between the emulation system and the actual single-chip microcomputer. Accordingly, in the case of emulating the product having the function added to the conventional peripheral circuit, it is not possible to easily execute the emulation without changing the interrupt priority order and by adding only the additional peripheral emulator.

Figure 1:
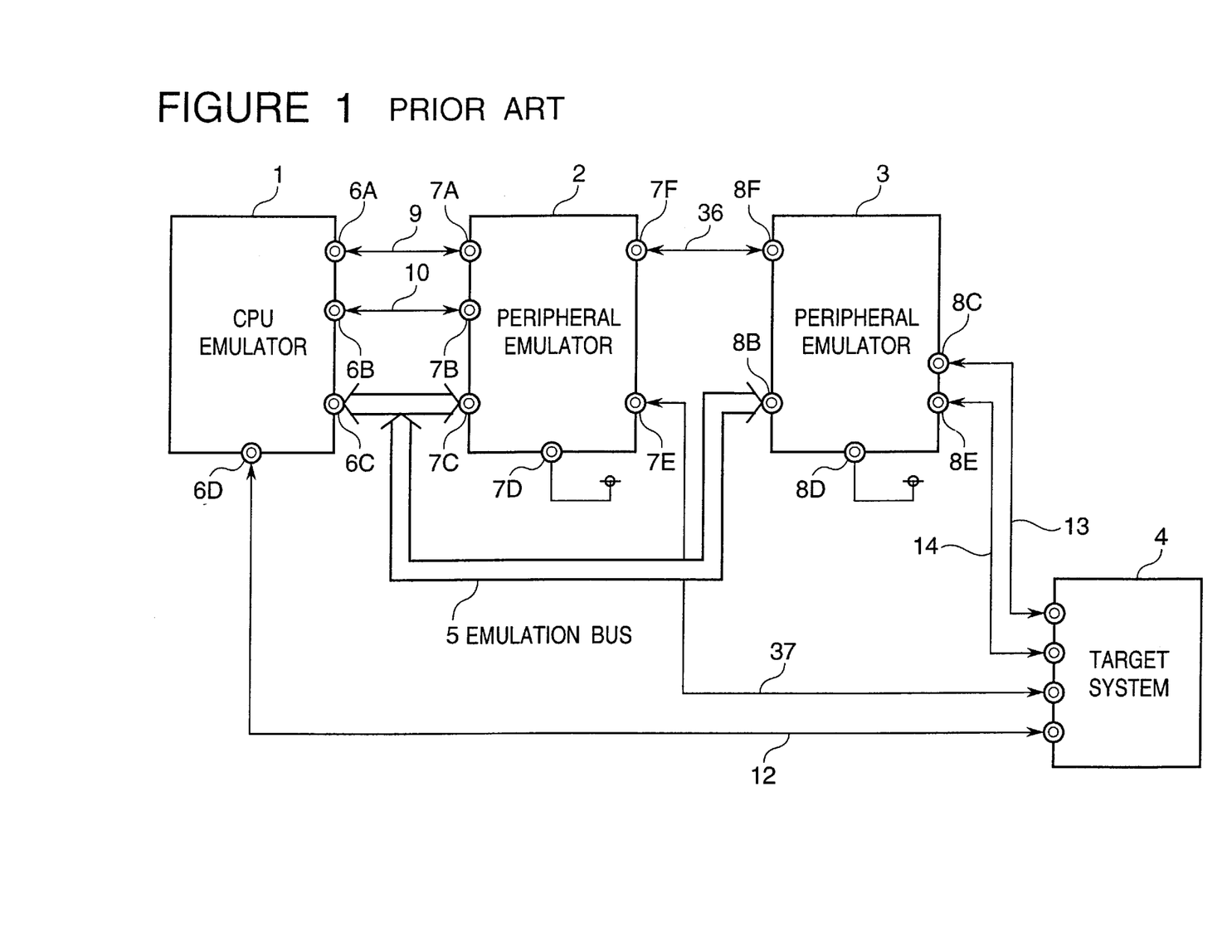
FIG. 1 is a block diagram of the first prior art example of the conventional emulation system.

Referring to FIG. 1, there is shown a block diagram of the first prior art example of the conventional emulation system.

The shown emulation system includes a CPU emulator 1, peripheral emulators 2 and 3 and a target system 4. The CPU emulator 1 and the peripheral emulators 2 and 3 are coupled to each other through an emulation bus 5. The CPU emulator 1 can access through the emulation bus 5 to a peripheral device internally provided in each of the peripheral emulators 2 and 3. Therefore, the peripheral device internally provided in each of the peripheral emulators 2 and 3 is operated exclusively to each other, by action of the access from the CPU emulator 1. In other words, when a certain peripheral device is emulated, the peripheral function of only one of the peripheral emulators 2 and 3 is accessed.

The CPU emulator 1 has external terminals 6A, 6B, 6C and 6D. The peripheral emulator 2 has external terminals 7A, 7B, 7C, 7D, 7E and 7F. The peripheral emulator 3 has external terminals 8B, 8C, 8D, 8E and 8F. In addition to the emulation bus 5, signal lines 9 and 10 are connected between the CPU emulator 1 and the peripheral emulator 2, and a signal line 36 is connected between the peripheral emulator 2 and the peripheral emulator 3. A signal line 12 is connected between the CPU emulator 1 and the target system 4, and a signal line 37 is connected between the target system 4 and the peripheral emulator 2. Signal lines 13 and 14 are connected between the target system 4 and the peripheral emulator 3.

Figure 2:
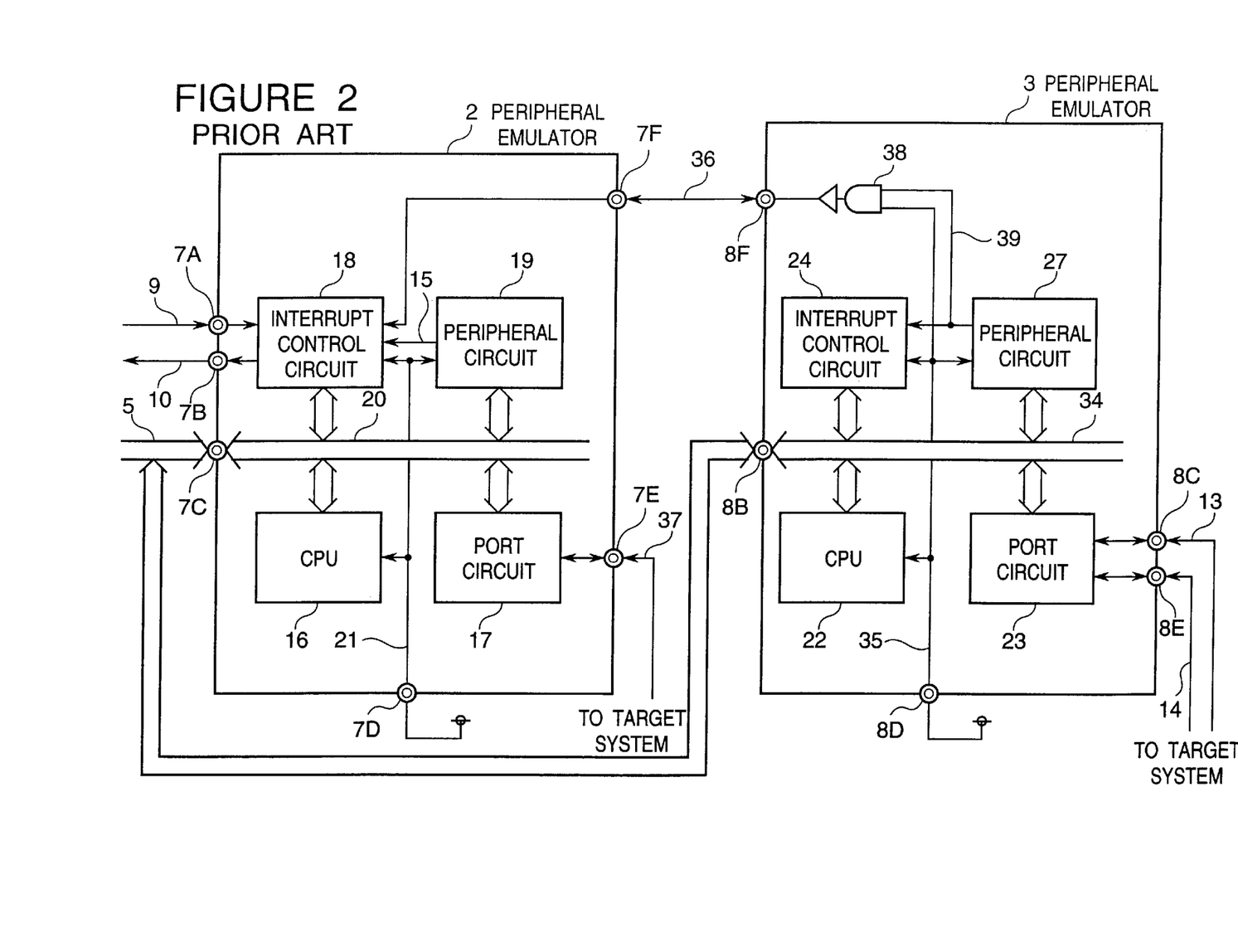
FIG. 2 is a block diagram illustrating an internal structure of the two peripheral emulators provided in the emulator system shown in FIG. 1.

Referring to FIG. 2, there is shown a block diagram of the two peripheral emulators 2 and 3 provided in the emulator system shown in FIG. 1.

As shown in FIG. 2, the peripheral emulator 2 includes a CPU 16, a port circuit 17, an interrupt control circuit 18 and a peripheral circuit 19, which are coupled to an internal bus 20. The external terminals 7A and 7B are connected to the interrupt control circuit 18, and the external terminal 7C is coupled to the internal bus 20. The external terminal 7D is connected to the CPU 16, the interrupt control circuit 18 and the peripheral circuit 19, and the external terminal 7F is connected to the port circuit 17. The external terminal 7F is connected to the interrupt control circuit 18.

The external terminal 7D is supplied with an emulation signal 21 for designating whether the peripheral emulator 2 is operated as the single-chip microcomputer or the peripheral emulator. If the emulation signal 21 of a logical "1" level is supplied to the external terminal 7D from the CPU emulator 1, the peripheral emulator 2 is put in a condition of operating as the peripheral emulator. In this condition, the CPU 16 is put into a disabled condition, and on the other hand, the interrupt control circuit 18, the peripheral 19 and the port circuit 17 are put in a condition allowing to be accessed from the CPU emulator 1 through the emulation bus 5 and the external terminal 7C. The port circuit 17 receives and outputs an input/output signal through the external terminal 7E from and to the target system 4, and information is transferred between the port circuit 17 and the internal bus 20. The interrupt control circuit 18 receives an interrupt request signal 15 from the peripheral circuit 19, and interrupt control signals are interfaced through the external terminals 7A and 7B between the CPU emulator 1 and the interrupt control circuit 18.

Thus, in the case of emulating the peripheral circuit 19 internally provided in the peripheral circuit 2, the CPU emulator 1 accesses the peripheral circuit 19 through the emulation bus 5 and the internal bus 20, and input/output signals are transferred between the peripheral circuit 19 and the target system 4 through the internal bus 20 and the external terminal 7E.

When an interrupt is generated internally in the peripheral circuit 19, the interrupt request signal 15 of a logical "1" level is outputted to the interrupt control circuit 18, which in turn discriminates whether or not the generation of the interrupt request signal 15 is permitted, and also discriminates the priority order of the generated interrupt request signal 15. If the generation of the interrupt request signal 15 is permitted, the interrupt control circuit 18 generates the vector code corresponding to the generated interrupt request signal 15, and the generated vector code is supplied through the emulation bus 5 to the CPU emulator 1. In response to this, a processing being executed in the CPU emulator 1 is interrupted, and an interrupt request corresponding to the interrupt request signal 15 from the peripheral circuit 19 is acknowledged, so that the interrupt processing is executed.

On the other hand, the peripheral emulator 3 includes a CPU 22, a port circuit 23, an interrupt control circuit 24, a peripheral circuit 27, and an AND circuit 38, which are connected as shown. The CPU 22, the port circuit 23, the interrupt control circuit 24, and the peripheral circuit 27 are coupled to an internal bus 34. The external terminal 8B is coupled to the internal bus 34. The external terminal 8D is connected to the CPU 22, the interrupt control circuit 24 and the peripheral circuit 27, and the external terminals 8E and 8C are connected to the port circuit 23. The external terminal 8F is connected to an output of the AND circuit 38, which in turn has a pair of inputs connected to the interrupt control circuit 24 and the peripheral circuit 27, respectively.

Similarly to the peripheral emulator 2, the external terminal 8D of the peripheral emulator 3 is supplied with the emulation signal 35 for designating whether the peripheral emulator 3 is operated as the single-chip microcomputer or the peripheral emulator. If the emulation signal 35 of a logical "1" level is supplied to the external terminal 8D from the CPU emulator 1, the peripheral emulator 3 is put in a condition of operating as the peripheral emulator. In this condition, the CPU 22 is put into a disabled condition, and on the other hand, the interrupt control circuit 24, the peripheral circuit 27 and the port circuit 23 are put in a condition allowing to be accessed from the CPU emulator 1 through the emulation bus S and the external terminal 8B. The port circuit 23 receives and outputs input/output signals through the external terminals 8C and 8E from and to the target system 4, and information is transferred between the port circuit 23 and the internal bus 20.

If an interrupt request signal 39 is generated in the peripheral circuit 27, the interrupt request signal 39 is transferred through the AND circuit 38 to the external terminal 8F, and furthermore, is supplied through the signal line 36 and the external terminal 7F to the interrupt control circuit 18 of the peripheral emulator 2. In the interrupt control circuit 18 of the peripheral emulator 2, the interrupt request signal 39 supplied from the peripheral emulator 3 is discriminated as an interrupt request signal having the interrupt priority order and the vector code of the external terminal 7F, similarly to the interrupt requested generated in the inside of the peripheral emulator 2, and then, a corresponding interrupt processing is conducted. Thus, the peripheral emulator 3 carries out the emulation of an peripheral circuit which is not internally provided in the peripheral emulator 2 or the peripheral circuit having a priority order different from that of the peripheral circuit 19 internally provided in the peripheral emulator 2.

Figure 3:
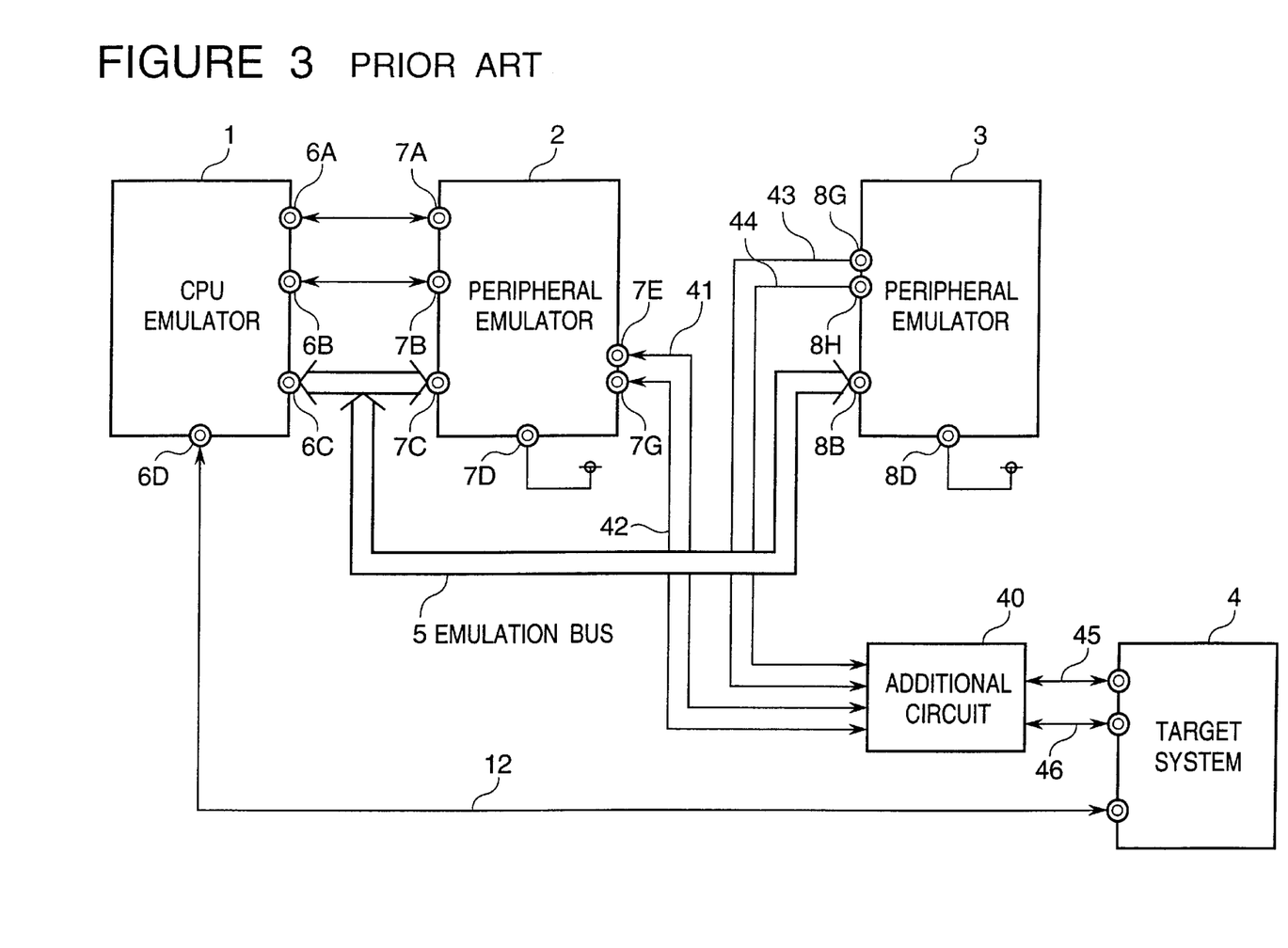
FIG. 3 is a block diagram of the second prior art example of the conventional emulation system.

Next, explanation will be made on an emulation of a peripheral circuit having an added function. FIG. 3 is a block diagram of a second prior art example of the conventional emulation system using a peripheral circuit internally provided in the peripheral emulator 2. In FIG. 3, elements similar to those shown in FIG. 1 are given the same Reference Numerals.

As shown in FIG. 3, this emulation system includes the CPU emulator 1, the peripheral emulators 2 and 3, the target system 4, and an additional circuit 40. Since the emulation of the peripheral device in this second prior art example is the same as that of the first prior art example shown in FIG. 1, explanation thereof will be omitted. Explanation will be focused on an emulation operation of the added function using the additional circuit 40 for multiplexing the input/output signals of the conventional peripheral circuit, as an additional function to the conventional peripheral circuit.

In the system shown in FIG. 3, since the peripheral circuit 19 internally provided in the peripheral emulator 2 does not comply with an emulation of the additional function, an emulation function is realized by the CPU emulator 1, the peripheral emulators 2 and 3, the target system 4, the emulation bus 5 and the additional circuit 40 corresponding to the additional function. The peripheral emulators 2 and 3 are provided with external terminals 7E and 7G and 8G and 8H, respectively, as external terminals for control signals for the additional circuit 40. These external terminals 7E and 7G and 8G and 8H are connected to the additional circuit 40 through signal lines 41, 42, 43 and 44, respectively.

As mentioned above, in order to execute the emulation by using the peripheral circuit 19 internally provided in the peripheral emulator 2, since the peripheral circuit 19 itself does not comply with the emulation of the additional function, it is necessary to provide the additional circuit 40. However, in order to transfer the signals for controlling the additional circuit 40, at least four external terminals are required, and therefore, it is practically impossible to execute the emulation while using these external terminals as the input/output port.

Under this circumstance, in the case of executing the emulation of the peripheral circuit having the added function, by use of the peripheral emulator 3, the interrupt request signal 39 generated in the peripheral circuit 27 internally provided in the peripheral emulator 3 is supplied through the external terminal 8F to the interrupt control circuit 18 of the peripheral emulator 2, similarly to the prior art example shown in FIG. 1. However, the interrupt priority order and the vector code of the conventional peripheral circuit are different from the interrupt priority order and the vector code of the peripheral circuit having the added function. This means that the timing of the interrupt processing in the emulation is different from the timing of the interrupt processing in an actual single-chip microcomputer.

As mentioned above, since one set of the interrupt priority order and the vector code are generated for each one interrupt request signal, it is impossible to execute the emulation of the peripheral circuit having the function added to the conventional peripheral circuit, without changing the priority order of the interrupt for the purpose of maintaining succession of a user's software. Therefore, it is impossible to emulate the peripheral circuit having the added function, by only addition of the peripheral emulator.

SUMMARY OF THE INVENTION

Accordingly, it is an object of the present invention to provide an emulation system which has overcome the above mentioned defect of the conventional one.

Another object of the present invention is to provide an emulation system capable of emulating a peripheral circuit having an added function, by only adding a peripheral emulator, without changing the priority order of the interrupt from the added function.

The above and other objects of the present invention are achieved in accordance with the present invention by an emulation system comprising an CPU emulator for executing an emulation corresponding to a central processing unit, and first and second peripheral emulators each for executing an emulation corresponding to a peripheral function, so that the CPU emulator and and first and second peripheral emulators function, as a whole, as an emulator for a target system, wherein for an additional peripheral function newly added to the peripheral function, called a conventional peripheral function, the emulation corresponding to the conventional peripheral function is executed by the first peripheral emulator, and input/output signals for the conventional peripheral function are supplied to the second peripheral emulator so that emulation corresponding to the additional peripheral function is executed by the second peripheral emulator, and input/output signals to be transferred between the first peripheral emulator and the target system are all transferred through the additional function of the second peripheral emulator.

In one embodiment of the emulation system, the second peripheral emulator is composed of a single-chip microcomputer including a central processing unit controlled by a predetermined emulation signal, a peripheral circuit having a conventional peripheral circuit and an additional peripheral circuit, an interrupt control circuit for controlling an interrupt to the peripheral circuit, an input/output switching circuit controlled by the predetermined emulation signal, for switching input/output signals between the first peripheral emulator and the peripheral circuit, and a port circuit for interfacing to the target system.

Specifically, the input/output switching circuit includes a means controlled by the emulation signal, for selecting either a signal supplied from the first peripheral emulator or a signal supplied from the conventional peripheral circuit, to supply the selected signal to the additional peripheral circuit, the means also supplying a signal supplied from the additional peripheral circuit, to either the first peripheral emulator or the conventional peripheral circuit.

The above and other objects, features and advantages of the present invention will be apparent from the following description of preferred embodiments of the invention with reference to the accompanying drawings.

DESCRIPTION OF THE PREFERRED EMBODIMENTS

Figure 4:
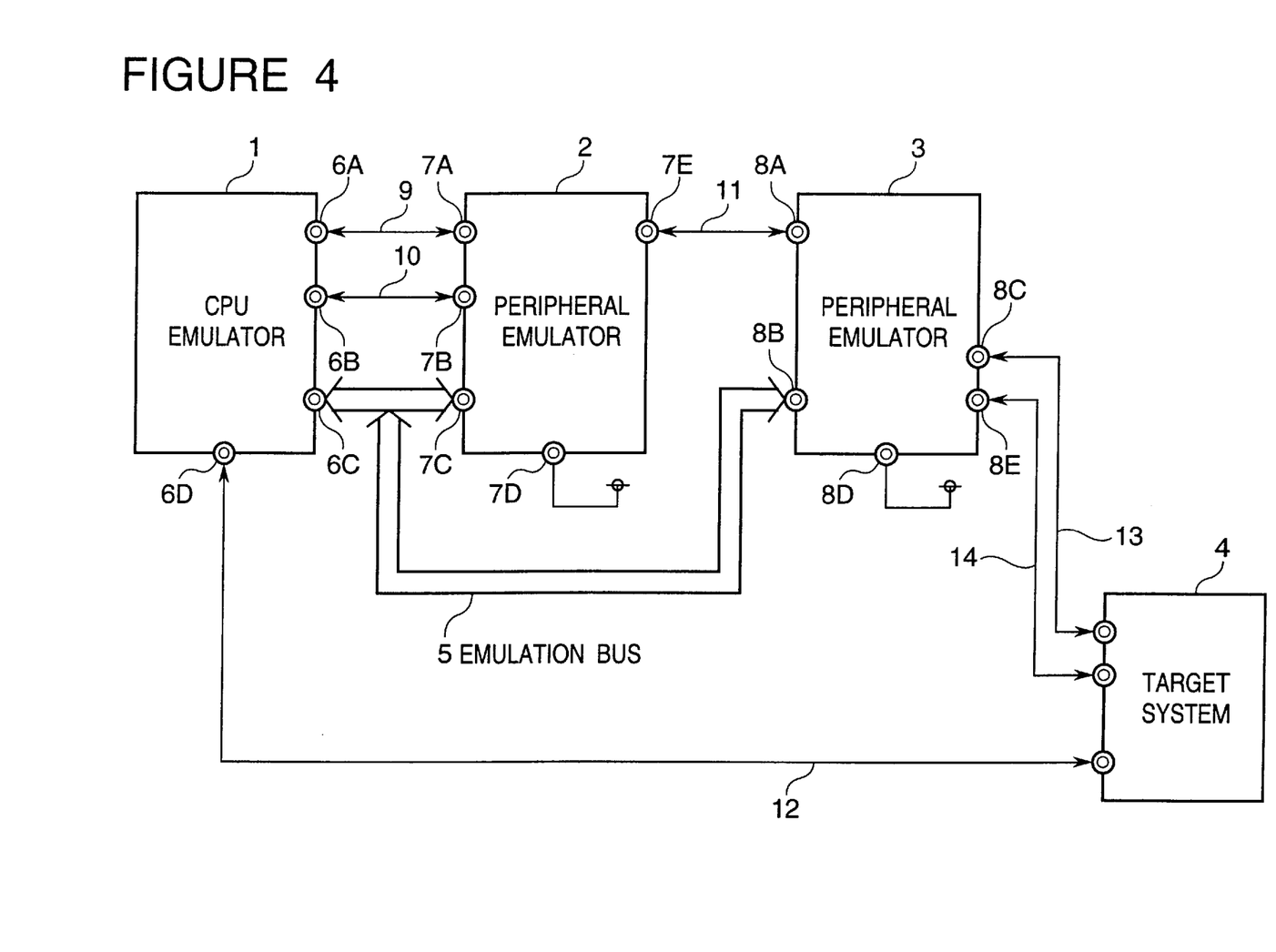
FIG. 4 is a block diagram of an embodiment of the emulation system in accordance with the present invention.

Referring to FIG. 4, there is shown a block diagram of an embodiment of the emulation system in accordance with the present invention. In FIG. 4, elements similar to those shown in FIGS. 1 and 3 are given the same Reference Numerals.

The shown embodiment includes a CPU emulator 1, peripheral emulators 2 and 3, and target system 4. The CPU emulator 1 and the peripheral emulators 2 and 3 are mutually coupled through an emulation bus 5, and the CPU emulator 1 can access through the emulation bus 5 to a peripheral device internally provided in each of the peripheral emulators 2 and 3. Accordingly, the respective peripheral devices internally provided in the peripheral emulators 2 and 3 are operated exclusively to each other, by means of the access from the CPU emulator 1. Thus, when a certain peripheral device is emulated, a peripheral function in only one of the peripheral emulators 2 and 3 is accessed.

The CPU emulator 1 has external terminals 6A, 6B, 6C and 6D. The peripheral emulator 2 has external terminals 7A, 7B, 7C, 7D and 7E. The peripheral emulator 3 has external terminals 8A, 8B, 8C, 8D and 8E. A signal line 9 is connected between the external terminal 6A of the CPU emulator 1 and the external terminal 7A of the peripheral emulator 2, and a signal line 10 is connected between the external terminal 6B of the CPU emulator 1 and the external terminal 7B of the peripheral emulator 2. The emulation bus 5 is coupled to the external terminal 6C of the CPU emulator 1, the external terminal 7C of the peripheral emulator 2, and the external terminal 8B of the peripheral emulator 3. A signal line 11 is connected between the external terminal 7E of the peripheral emulator 2 and the external terminal 8A of the peripheral emulator 3. A signal line 12 is connected between the target system 4 and the external terminal 6D of the CPU emulator 1. Signal lines 13 and 14 are connected between the target system 4 and the external terminals 8C and 8E of the peripheral emulator 3, respectively.

With this arrangement, an interfacing of an interrupt request control and others between the CPU emulator 1 and the peripheral emulators 2 and 3 are conducted through the signals lines 9 to 11, and an input/output signal between the peripheral emulators 2 and 3 is transferred through the signal line 11. An input/output signal between the CPU emulator 1 and the target system 4 is transferred through the signal line 12. Input/output signals between the peripheral emulator 3 and the target 4 are transferred through the signal lines 13 and 14.

As seen from comparison between FIGS. 1 and 4, main constituents of the shown embodiment are similar to those of the prior art examples explained hereinbefore. In the shown embodiment, however, the control signal supplied from the target system 4 to the peripheral emulator 2 is omitted, and the external terminal 8F of the peripheral emulator 3 shown in FIG. 1 is replaced by the external terminal 8A.

With this arrangement, an emulation corresponding to a conventional peripheral function is executed by the peripheral emulator 2, and on the other hand, since input/output signals of a conventional peripheral circuit are supplied to an additional peripheral circuit of the peripheral emulator 3, an emulation of an additional function can be executed by the peripheral emulator 3. Thus, an emulation of the peripheral circuit including the additional function can be executed without changing the interrupt priority order or level. The additional function in this case, is exemplified by addition of a circuit (additional peripheral circuit) for processing an input/output signal of the conventional peripheral circuit without modifying the conventional peripheral circuit itself, for example, a circuit which can switch an input/output terminal for the input/output signal of the conventional peripheral circuit, to another terminal.

In the peripheral emulator 3 of the shown embodiment, the external terminal 8A is provided in place of the external terminal 8F through which the interrupt request signal was outputted from the peripheral emulator 3 in the prior art examples. By provision of this external terminal 8A, the input/output signal transferred through the signal line 37 between the peripheral emulator 2 of the prior art examples and the target system 4, is supplied through the external terminal 8A to an additional peripheral circuit 27 shown in FIG. 5 internally provided in the peripheral emulator 3. Thus, the input/output signal is transferred through the additional peripheral circuit 27 of the peripheral emulator 3 between the peripheral circuit 19 of the peripheral emulator 2 and the target system 4.

Figure 5:
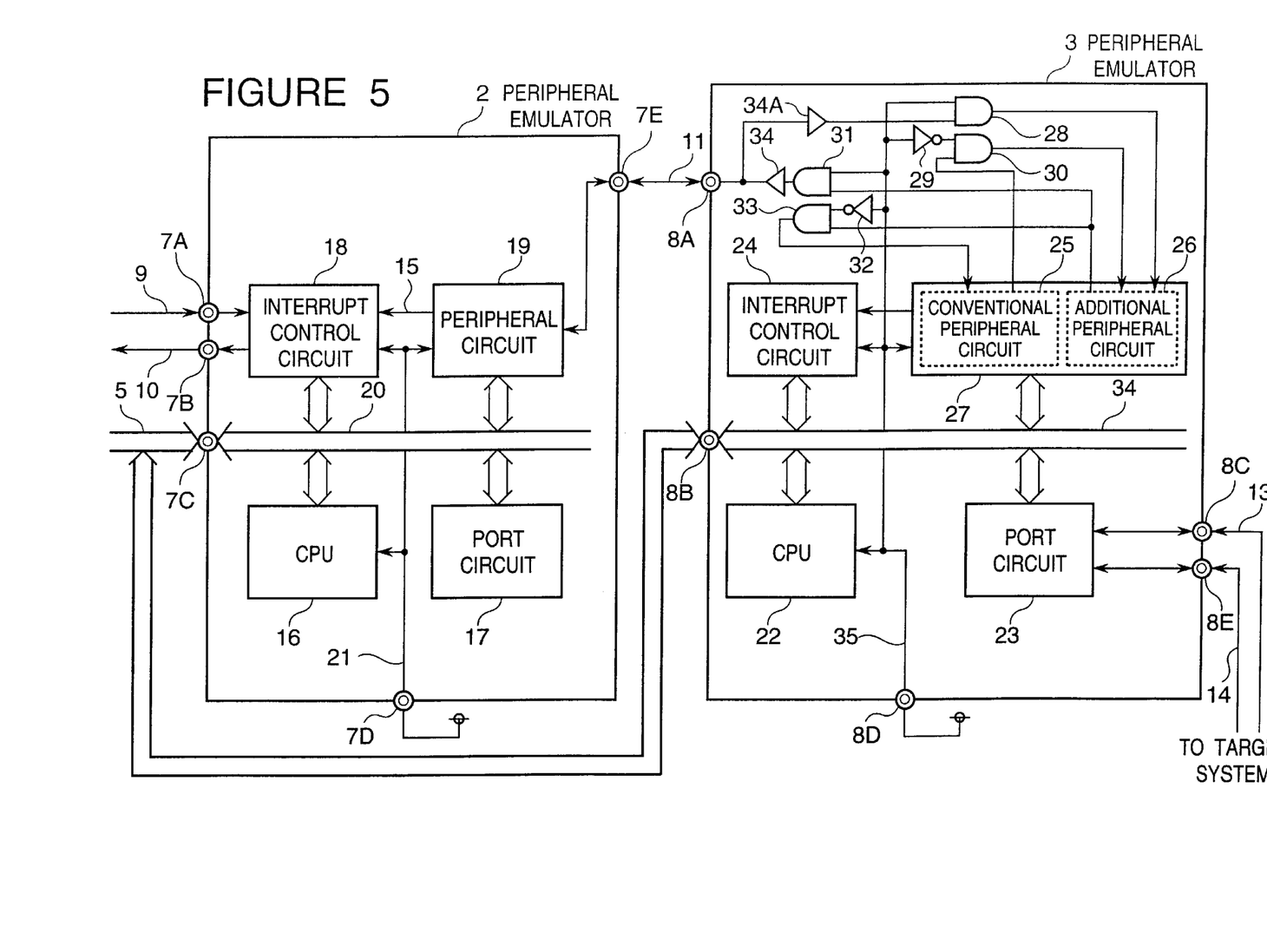
FIG. 5 is a block diagram illustrating an internal structure of the two peripheral emulators provided in the emulator system shown in FIG. 4.

Referring to FIG. 5, there is shown a block diagram illustrating an internal structure of the two peripheral emulators provided in the emulator system shown in FIG. 4. In FIG. 5, elements similar to those shown in FIG. 2 are given the same Reference Numerals, and explanation thereof will be omitted.

As seen from comparison between FIGS. 2 and 5, the peripheral emulator 2 of the shown embodiment has the same construction as that of the peripheral emulator 2 of the prior art example shown in FIG. 2, and therefore, explanation will be omitted.

The peripheral emulator 3 of the shown embodiment includes an internal data bus 34, a CPU 22, a port circuit 23, an interrupt control circuit 24, a peripheral circuit 27, AND circuits 28, 30, 31 and 33, inverters 29 and 32, and buffers 34 and 34A, which are coupled as shown. The peripheral circuit 27 includes a conventional peripheral circuit 25 and an additional peripheral circuit 26.

The CPU 22, the port circuit 23, the interrupt control circuit 24, and the peripheral circuit 27 are coupled to the internal bus 34. The external terminal 8I3 is coupled to the internal bus 34. The emulation signal 35 supplied through the external terminal 8D is supplied to the CPU 22, the interrupt control circuit 24 and the, peripheral circuit 27, and the external terminals 8E and 8C are connected to the port circuit 23. The emulation signal 35 supplied through the external terminal 8D is also supplied directly to one input of the AND circuit 28 and one input of the AND circuit 31, and further, through the inverter 29 to one input of the AND circuit 30 and through the inverter 32 to one input of the AND circuit 33. An output of the AND circuit 31 is connected through the buffer 34 to the external terminal 8A, which is in turn connected through the buffer 34A to the other input of the AND circuit 28. Therefore, the signal outputted through the external terminal 7E from the peripheral circuit 19 internally provided in the peripheral emulator 2, is supplied through the signal line 11, the external terminal 8A, and the buffer 34A to the AND circuit 28. An output of the AND circuit 28 is connected to the additional peripheral circuit 26. A signal outputted from the conventional peripheral circuit 25 is supplied to the other input of the AND circuit 30, and the output of the AND circuit 30 is connected to the additional peripheral circuit 26. A signal outputted from the additional peripheral circuit 26 is supplied to the other input of each of the AND circuits 31 and 33, and the output of the AND circuit 33 is connected to the conventional peripheral circuit 25. Therefore, under the control of the emulation signal 35, the signal outputted from the additional peripheral circuit 26 is supplied either through the AND circuit 31, the buffer 34, the external terminal 8A and the signal line 11 to the peripheral emulator 2, or through the AND circuit 33 to the conventional peripheral circuit 25.

Thus, a logic circuitry composed of the AND circuits 28, 30, 31 and 33, the inverters 29 and 32, and the buffers 34 and 34A, constitutes an input/output switching-over circuit for switching over an input/output signal between the additional peripheral circuit 26, the conventional peripheral circuit 25 and the peripheral emulator 2, and the input/output switching-over circuit is controlled by the emulation signal 35.

In the embodiment shown in FIG. 5, the conventional peripheral circuit 25 and the additional peripheral circuit 26 included in the peripheral circuit 27 of the peripheral emulator 3 operate as one peripheral circuit (which includes both the conventional peripheral circuit 25 and the additional peripheral circuit 26), in the case that the peripheral emulator 3 operates as a single-chip microcomputer. On the other hand, when the peripheral emulator 3 operates as a peripheral emulator, the conventional peripheral circuit 25 is put into an disabled condition, and only the additional peripheral circuit 26 is put into an operable condition. Respective operations of the CPU 22, the port circuit 23, the interrupt control circuit 24, the internal bus 34 and the external terminals 8A to 8E in this operating condition are the same as those of the prior art example shown in FIG. 2, and therefore, explanation will be omitted.

As mentioned above, the peripheral emulator 3 of the shown embodiment also includes, in addition to the above peripheral circuits, the input/output switching-over circuit composed of the AND circuits 28, 30, 31 and 33, the inverters 29 and 32, and the buffers 34 and 35, and controlled by the emulation signal 35. Thus, a signal source of a signal supplied to the additional peripheral circuit 26 and a transfer destination of the signal outputted from the additional peripheral circuit 26 are simultaneously controlled by the level of the emulation signal 35. In other words, in accordance with a logical level of the emulation signal 35, either the signal supplied through the external terminal 8A or the signal supplied from the conventional peripheral circuit 25 is selected as the signal supplied to the additional peripheral circuit 26. Similarly, in accordance with the logical level of the emulation signal 35, the signal outputted from the additional peripheral circuit 26 is alternatively supplied either to the peripheral emulator 2 through the external terminal 8A or to the conventional peripheral circuit 25.

The emulation signal 35 supplied through the external terminal 8D assumes a logical "0" level when the peripheral emulator 3 operates as the single-chip microcomputer, and a logical "1" level when the peripheral emulator 3 operates as the peripheral emulator. When the emulation signal 35 of the logical "0" level is supplied through the external terminal 8D, and therefore, when the peripheral emulator 3 operates as the single-chip microcomputer, the additional peripheral circuit 26 operates as an additional peripheral function of the peripheral circuit 27 of the peripheral emulator 3, and processes the input/output signal of the conventional peripheral circuit 25, so that the result of the processing is outputted to the internal bus 34. When the emulation signal 35 of the logical "1" level is supplied through the external terminal 8D, and therefore, when the peripheral emulator 3 operates, as the peripheral emulator, the additional peripheral circuit 26 operates as an additional peripheral function of the peripheral circuit 19 of the peripheral emulator 2, and processes the input/output signal transferred through the external terminal 8A, so that the result of the processing is outputted to the internal bus 34.

Now, with reference to FIGS. 4 and 5, explanation will be made about an emulation operation in the case that the additional peripheral function makes it possible to switch over the input/output signal of the conventional peripheral circuit 25.

In this case, the emulation signal 35 supplied through the external terminal 8D is set to the logical "1" level. Therefore, the output of the inverters 29 and 32 are brought to the logical "0" level, so that the output of the AND circuits 30 and 33 are correspondingly brought to the logical "0" level. On the other hand, the AND circuit 28 transfers the signal supplied through the external terminal 8A from the peripheral emulator 2 to the additional peripheral circuit 26, and the AND circuit 31 outputs the signal having the same logical level as that of the signal outputted from the additional peripheral circuit 26, so that the signal outputted from the AND circuit 31 is transferred through the buffer 34, the external terminal 8A and the signal line 11 to the peripheral emulator 2. Furthermore, the CPU emulator 1 accesses the peripheral circuit 19 of the peripheral emulator 2 through the emulation bus 5, so that the emulation of the conventional peripheral function is executed. The input/output signal of the peripheral circuit 19 of the peripheral emulator 2 is transferred to or from the peripheral emulator 3 through the external terminal 7E and the signal line 11. In this case, since the emulation signal 35 supplied through the external terminal 8D is set to the logical "1" level, the signal outputted from the peripheral circuit 19 of the peripheral emulator 2 is supplied through the external terminal 8A, the buffer 34A and the AND circuit 28 to the additional peripheral circuit 26 of the peripheral emulator 3. In this additional peripheral circuit 26, a destination of the supplied signal, namely, a terminal to which the supplied signal is transferred is selected or designated, and the supplied signal is transferred through the internal bus 34 and the port circuit 23 to the designated external terminal, for example, 8C, which is further transferred through the line 13 to the target system 4. If the external terminal 8E is selected or designated, the supplied signal is transferred through the internal bus 34 and the port circuit 23 to the designated external terminal 8E, and further through the line 14 to the target system 4.

On the other hand, the signal outputted from the additional peripheral circuit 26 of the peripheral emulator 3 and to be supplied to the peripheral circuit 19 of the peripheral emulator 2, is transferred through the AND circuit 31, the buffer 34 and the external terminal 11 to the peripheral emulator 2. Here, the signal outputted from the additional peripheral circuit 26 of the peripheral emulator 3, is one signal, selected by the additional peripheral circuit 26, from two signals, namely, a signal supplied from the target system 4 through the signal line 13 and the external terminal 8C and also through the port circuit 23 and the internal bus 34 to the additional peripheral circuit 26, and another signal supplied from the target system 4 through the signal line 14 and the external terminal 8E and also through the port circuit 23 and the internal bus 34 to the additional peripheral circuit 26. Therefore, when an interrupt request is generated in the peripheral circuit including the additional function, the interrupt request signal is supplied from the peripheral circuit 19 of the peripheral emulator 2 to the interrupt control circuit 18 as the interrupt request signal 15. Therefore, the interrupt priority order does not differ from that of the conventional one. Thus, the emulation of the peripheral circuit 27 having the additional function capable of switching over the input/output terminal of the input/output signal of the conventional peripheral circuit 25, can be executed without changing the interrupt priority order from the conventional one.

As mentioned above, the signal outputted from the peripheral circuit 19 is outputted from an output terminal which is selected and designated by the additional peripheral circuit 26 under control of the emulation signal 35, and the signal supplied to the peripheral circuit 19 is supplied from an input terminal which is selected and designated by the additional peripheral circuit 26 under control of the emulation signal 35.

An emulation of the peripheral circuit 27 having the additional function capable of switching over the input/output terminal of the input/output signal of the conventional peripheral circuit 25, can be executed without changing the interrupt priority order or level from the conventional one.

As seen from the above, the present invention is applied to an emulation system including, as an emulation circuit for a peripheral function, first and second single-chip microcomputers each operable as a peripheral emulator, so that an emulation of the peripheral function can be executed. The present invention is characterized by adding, into the inside of a second peripheral emulator having a conventional peripheral circuit and an additional peripheral circuit as a peripheral circuit, an input/output switching circuit for switching over the input/output signal between the additional peripheral circuit and a peripheral circuit of a first peripheral emulator. With this feature, it is possible to select, as the signal to be supplied to the additional peripheral circuit, either the signal supplied through the external terminal from the first peripheral emulator or the signal outputted from the conventional peripheral circuit, and at the same time, it is also possible to selectively supply the signal outputted from the additional peripheral circuit, either to the first peripheral emulator through the external terminal, or to the conventional peripheral circuit. Thus, it is possible to access the additional peripheral circuit as the additional function of the peripheral circuit internally provided in the first peripheral emulator. Therefore, a product having an additional function added to the conventional peripheral circuit, can be emulated only by adding the peripheral emulator and without changing the interrupt priority order or level. In other words, an extra development is no longer necessary in order to improve an existing peripheral emulator.

The invention has thus been shown and described with reference to the specific embodiments. However, it should be noted that the present invention is in no way limited to the details of the illustrated structures but changes and modifications may be made within the scope of the appended claims.

I claim:

1. An emulation system comprising a CPU emulator for executing an emulation corresponding to a central processing unit, and first and second peripheral emulators each executing an emulation corresponding to a peripheral function, so that said CPU emulator and said first and second peripheral emulators function, as a whole, as an emulator for a target system, wherein for an additional peripheral function newly added to said peripheral function, called a conventional peripheral function, the emulation corresponding to said conventional peripheral function is executed by said first peripheral emulator, and input/output signals for said conventional peripheral function are supplied to said second peripheral emulator so that emulation corresponding to said additional peripheral function is executed by said second peripheral emulator, and input/output signals to be transferred between said first peripheral emulator and said target system are all transferred through said additional function of said second peripheral emulator, said second peripheral emulator comprising 1) a single chip microcomputer including a central processing unit controlled by a predetermined emulation signal;

2) a peripheral circuit having a conventional peripheral circuit and an additional peripheral circuit;

3) an interrupt control circuit for controlling an interrupt to said peripheral circuit;

4) an input/output switching circuit controlled by said predetermined emulation signal, for switching input/output signals between said first peripheral emulator and said peripheral circuit, said input/output switching circuit includes a means controlled by said emulation signal, for selecting either a signal supplied from said first peripheral emulator or a signal supplied from said conventional peripheral circuit, to supply the selected signal to said additional peripheral circuit, said means also supplying a signal supplied from said additional peripheral circuit, to either said first peripheral emulator or said conventional peripheral circuit; and 5) a port circuit for interfacing to said target.

* * * * *

UNITED STATES PATENT AND TRADEMARK OFFICE
CERTIFICATE OF CORRECTION

PATENT NO. : 5,864,694
DATED : January 26, 1999
INVENTOR(S) : Kiyomi Yamashiro

It is certified that error appears in the above-identified patent and that said Letters Patent is hereby corrected as shown below:

Column 10, line 31, "An emulation..." should not befin new paragraph.

Signed and Sealed this

Fourteenth Day of November, 2000

Attest:

Q. TODD DICKINSON

Attesting Officer

Director of Patents and Trademarks

UNITED STATES PATENT AND TRADEMARK OFFICE
CERTIFICATE OF CORRECTION

PATENT NO.   : 5,864,694
DATED        : January 26, 1999
INVENTOR(S)  : Kiyomi Yamashiro It is certified that error appears in the above-identified patent and that said Letters Patent is hereby corrected as shown below:

Column 10,
Line 31, "An emulation..." should not begin new paragraph.

Signed and Sealed this

Ninth Day of October, 2001

*Attest:*

NICHOLAS P. GODICI
*Attesting Officer*   *Acting Director of the United States Patent and Trademark Office*

UNITED STATES PATENT AND TRADEMARK OFFICE
CERTIFICATE OF CORRECTION

PATENT NO. : 5,864,694  
DATED : January 26, 1999  
INVENTOR(S) : Kiyomi Yamashiro Page 1 of 1

It is certified that error appears in the above-identified patent and that said Letters Patent is hereby corrected as shown below:

<u>Title page,</u>
Item [56], References Cited, insert
-- 2-130640   5/18/90 Japan
   5-334460   12/17/93 Japan --

Signed and Sealed this

Sixteenth Day of April, 2002

Attest:

Attesting Officer

JAMES E. ROGAN  
Director of the United States Patent and Trademark Office